(No Model.) 2 Sheets—Sheet 1.

R. LANGENBACH.
SUPPORT FOR CHRISTMAS TREES OR OTHER ARTICLES.

No. 392,871. Patented Nov. 13, 1888.

WITNESSES:
Eduard Wolff
William Miller

INVENTOR.
Rudolf Langenbach.
BY Van Santvoord & Hauff
ATTORNEYS.

(No Model.) Sheets—Sheet 2.

R. LANGENBA[CH]
SUPPORT FOR CHRISTMAS TREES OR OTHER ARTICLES.

No. 392,871. Patented Nov. 13, 1888.

WITNESSES:
Eduard Wolff
William Miller

INVENTOR·
Rudolf Langenbach
BY
Van Santvoord & Hauff
ATTORNEYS.

UNITED STATES PATENT OFFICE.

RUDOLF LANGENBACH, OF NEW YORK, N. Y.

SUPPORT FOR CHRISTMAS-TREES OR OTHER ARTICLES.

SPECIFICATION forming part of Letters Patent No. 392,871, dated November 13, 1888.

Application filed June 29, 1888. Serial No. 278,554. (No model.)

*To all whom it may concern:*

Be it known that I, RUDOLF LANGENBACH, a citizen of the United States, residing at New York, in the county and State of New York, have invented new and useful Improvements in Supports for Christmas-Trees and other Articles, of which the following is a specification.

This invention has for its object to provide novel means for supporting a Christmas-tree or a table-top; and to such end the invention consists in the combination, with a standard having at its lower end a base-piece secured by a detachable screw and provided with pivoted legs having arms extending above the pivots, of a table-top having radial slots for the passage of the said legs and changeable from the upper end of the standard to a position beneath the base piece carrying the pivoted legs, and a detachable fastening for securing the table-top to the upper end of the standard, all as more fully hereinafter described, reference being made to the accompanying drawings, in which—

Figure 1:
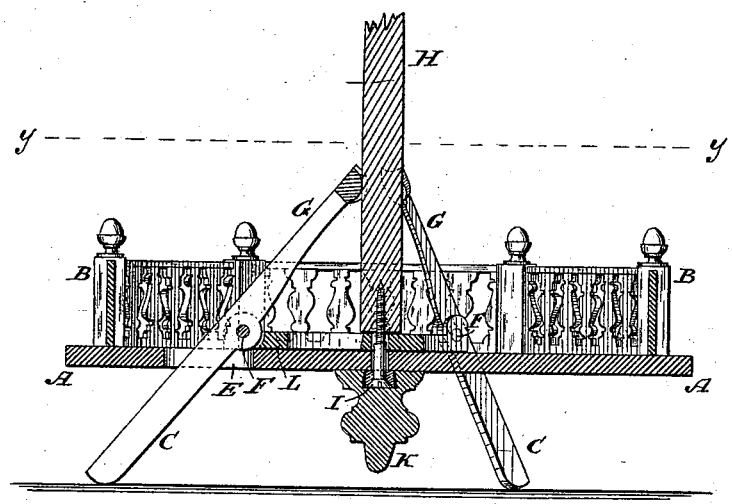
Figure 2:
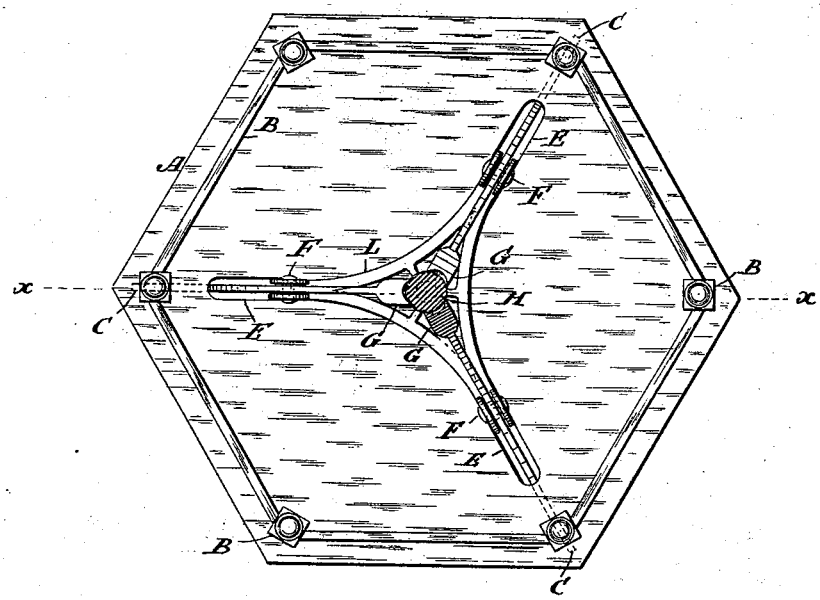
Figure 3:
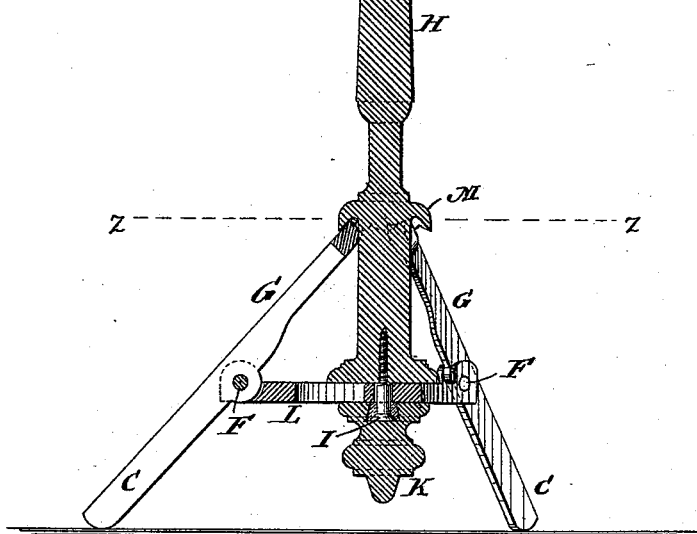

Figure 1 is a sectional view on the line *x x*, Fig. 2, showing the invention arranged in connection with a portion of the stem or trunk of a Christmas-tree; Fig. 2, a sectional view on the line *y y*, Fig. 1; Fig. 3, a sectional view on the line *w w*, Fig. 4, showing the invention arranged in connection with the leg of a table; and Fig. 4, a sectional view on the line *z z*, Fig. 3.

In order to enable those skilled in the art to make and use my invention, I will now describe the same in detail, referring to the drawings, wherein—

Figure 4:
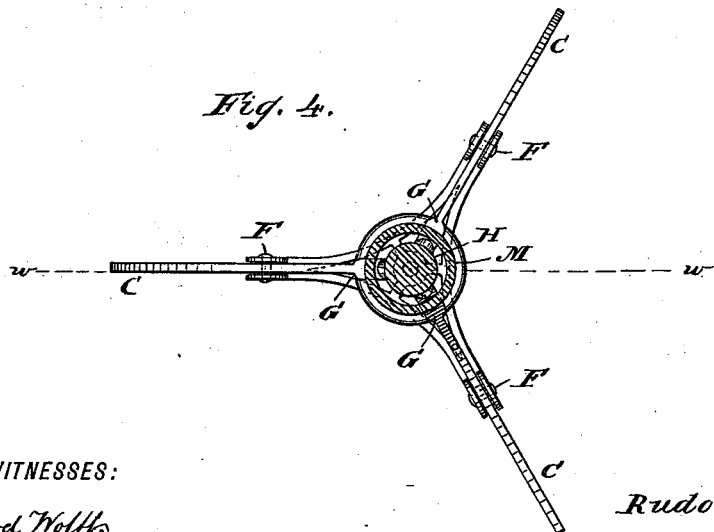

The letter H indicates a standard, which may be the stem or trunk of a Christmas-tree, as in Figs. 1 and 2, or the leg of a table, as in Figs. 3 and 4. The table-top A may have any suitable ornamental railing, B, and is provided with radial slots E and a detachable center fastening, N—such as a screw—by which said top can be removably secured to the upper end of the standard. The base-piece L is secured to the lower end of the standard by a detachable screw, I, which may have a knob or handle, K, for conveniently removing and replacing it, and to the base-piece are hinged, by pivots F, the supporting-legs C, three or more, each having an arm, G, extending above its pivot to bear against the standard H, so that the downward pressure of the standard on the base-piece tends to spread the legs and force the arms G against such standard. If desired, the standard may be provided with shoulders or offsets M, to serve as abutments for the arms G, as in Fig 3.

The invention, as shown in Figs. 3 and 4, is in connection with a standard that constitutes a table-leg, and the table-top A is detachably secured to the upper end of the leg.

If the invention is to be used as an ornamental support for a Christmas-tree, the screw or other fastening, N, is detached and the table-top A is changed to a position beneath the base-piece L, where it is held by first removing the screw I, and then passing the latter through the table-top and base-piece into the Christmas-tree, all as shown in Figs. 1 and 2. To permit this change, the table-top is furnished with the radial slots E (before mentioned, for the passage of the pivoted legs C. When the table-top is secured beneath its base-piece, it constitutes a table for supporting any desired articles to ornament the surroundings of a Christmas-tree, and when such top is secured to the upper end of a standard it serves as an ordinary table.

What I claim is—

The combination, with a standard having at its lower end a base piece secured by a detachable screw and provided with pivoted legs having upwardly-projecting arms, of a table-top having radial slots for the passage of the pivoted legs and changeable from the upper end of the standard to a position beneath the base-piece, and a detachable fastening for securing the table-top to the upper end of the standard, substantially as described.

In testimony whereof I have hereunto set my hand and seal in the presence of two subscribing witnesses.

RUDOLF LANGENBACH. [L. S.]

Witnesses:
 W. C. HAUFF,
 E. F. KASTENHUBER.